United States Patent
Tellier et al.

(10) Patent No.: US 6,223,298 B1
(45) Date of Patent: Apr. 24, 2001

(54) INTERFACE FOR COMMUNICATION WITH AN IC CARD, AND APPARATUS FITTED WITH SUCH AN INTERFACE

(75) Inventors: Vincent Tellier, Loos; Michel Talaga, Louvil; Daniel Deroo, Lesquin, all of (FR)

(73) Assignee: Micropross, Lille (FR)

( * ) Notice: Subject to any disclaimer, the term of this patent is extended or adjusted under 35 U.S.C. 154(b) by 0 days.

(21) Appl. No.: 09/208,777

(22) Filed: Dec. 10, 1998

(30) Foreign Application Priority Data

Dec. 11, 1997 (FR) .................................................. 97 15974

(51) Int. Cl.⁷ ................................. G06F 1/08; G06F 3/00
(52) U.S. Cl. ............................. 713/501; 710/71; 713/502
(58) Field of Search ..................................... 713/400, 501, 713/503, 502; 710/33, 60, 61, 62, 71

(56) References Cited

U.S. PATENT DOCUMENTS

| | | | |
|---|---|---|---|
| 5,070,233 | * 12/1991 | Takizawa et al. | 235/380 |
| 5,151,986 | * 9/1992 | Langan et al. | 710/112 |
| 5,319,598 | * 6/1994 | Aralis et al. | 365/189.12 |
| 5,335,105 | * 8/1994 | Carlton | 359/135 |
| 5,712,881 | * 1/1998 | Iijima | 375/354 |
| 6,041,372 | * 3/2000 | Hart et al. | 710/62 |

FOREIGN PATENT DOCUMENTS 0 347 894   12/1989 (EP) .
0 617 379   9/1994 (EP) .

* cited by examiner

Primary Examiner—Thomas M. Heckler
(74) Attorney, Agent, or Firm—Wolf, Greenfield & Sacks, P.C.

(57) ABSTRACT

The communications interface enables a processor unit to dialog with an IC card having an elementary time unit (ETU) for transmitting one bit that is equal to (K/Fs). The IC card includes a microprocessor, a clock pin for application of an external clock signal enabling the microprocessor of the IC card to be clocked, and an I/O pin. The microprocessor receives external data or transmits data via the I/O pin. The communications interface includes a serial communications line for interchanging data with the IC card via the I/O pin. The communications interface also includes a transmitting module, which is written-addressable by the processor unit and includes a serialization module for serializing and transmitting, over the serial communications line, data received from the processor unit. The communications interface also includes a receiving module, which is read-addressable by the processor unit and includes a serialization module for serializing data received over the serial communications line. The communications interface also includes a first clock signal having an adjustable frequency and a second clock signal which is synchronous with the first clock signal and which enables the serialization modules of the transmitting and receiving modules to be clocked. The frequency ratio between the first clock signal and the second clock signal is preferably equal to the factor (K).

9 Claims, 1 Drawing Sheet

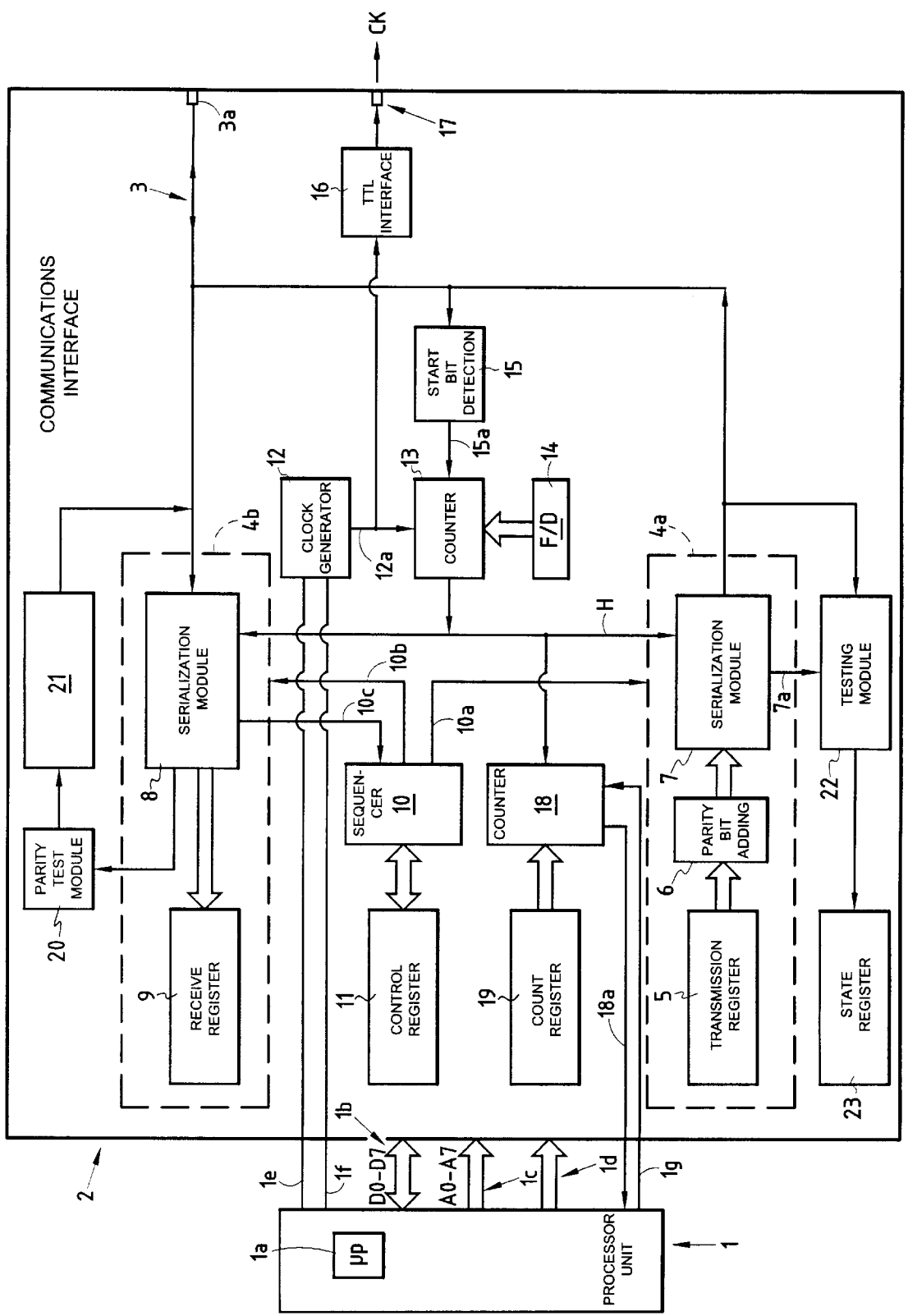

INTERFACE FOR COMMUNICATION WITH AN IC CARD, AND APPARATUS FITTED WITH SUCH AN INTERFACE

The invention relates to interchanging data with an IC card. It relates more particularly to an improved communications interface between a processor unit, of the microprocessor type, and an IC card. The communications interface of the invention is designed for implementation in any apparatus having the function of interchanging data in transmission and/or in reception with an IC card, and in particular for implementation in a reader, a programmer, or a tester of IC cards.

BACKGROUND OF THE INVENTION

At present there are two types of IC cards: IC cards which essentially comprise a memory and are not fitted with a microprocessor or the like; IC cards which are fitted with a microprocessor, memory and inputs/outputs. The term "IC card" will refer hereafter to IC cards fitted with a microprocessor or the like.

The inputs/outputs of an IC card essentially comprise a both-way serial communications line for interchanging data with an external device, and a clock line (CK) enabling an external clock signal to be applied for the purpose of clocking the microprocessor of the IC card.

At present, IC cards are required to comply with international standard ISO 7816-3, which defines electrical characteristics. In compliance with that standard, each byte is transmitted over the serial communications line, and is put into the following serial format: a start bit (always 0), eight data bits D0 to D7 or D7 to D0 (in positive or negative logic), a parity bit (odd or even), and a stop bit. Each IC card is also characterized by an elementary time unit corresponding to the time required to transmit one bit on the serial communications line. This elementary time unit is abbreviated ETU in the above-mentioned standard, and for a given IC card it depends on a factor F/D and on the frequency Fs of the clock signal applied to the IC card. More precisely, the elementary time unit ETU in seconds for an IC card is given by the formula: ETU=(F/D)/Fs. Each IC card is given predetermined values for the parameters F and D. In particular, the above-mentioned standard specifies that the parameter F can take the following values: 372, 558, 744, 1116, 1488, 1860, 512, 768, 1024, 1536, and 2048, and that the parameter D can take the following values: 1, 2, 4, 8, 16, 32, 20, ½, ¼, ⅛, 1/16, 1/32, and 1/64. With certain types of IC card, the values for the parameters F and D can also be modified, thereby making it possible advantageously to modify the speed of dialog with the IC card.

There are two different ways in which data can be interchanged, in reception and/or transmission, between an IC card and an external device implementing a microprocessor, such as an IC card reader, a programmer, or a tester: purely software processor means implemented by the microprocessor of the external device; or an electronic interface implemented between the microprocessor of the external device and the IC card for the purpose of controlling communication with the IC card over the serial communications line of the IC card.

With purely software processing, the microprocessor of the external device must know the elementary time unit ETU of the IC card. On reception, the software implemented by the microprocessor of the external device is designed, for example, to scan the serial communications line of the IC card in order to detect the first start bit sent by the IC card over the serial communications line, so that starting from detection of the start bit, it samples the state of the serial communications line at predetermined time intervals corresponding to the elementary time unit ETU of the IC card, and finally, on reception, it takes the bits it has received and serializes (reconstitutes) the byte as transmitted by the card (data bits D0 to D7). Implementing software type processing requires software timing to be simulated that is calibrated as a function of the frequency of the clock signal applied to the IC card and as a function of the parameters F and D, i.e. as a function of the elementary time unit ETU for which the IC card is configured. In addition, with software processing, serialization of the bits, e.g. to reconstitute a received byte, can be performed using a long elementary time unit ETU, e.g. equal to 104 µs, which corresponds to the conventional transmission speed of 9600 bauds, but which gives rise to problems with shorter elementary time units, particularly units that are of the order of a few microseconds. It is necessary for the microprocessor to have processing power that is sufficient to enable the instructions of the software to be performed within the time made available by the speed of dialog with the IC card. That is why the software solution for controlling data interchange with an IC card is suitable solely for applications that implement IC card dialog speeds that are low.

To dialog with an IC card at higher speeds, i.e. in other words with an IC card configured to use a shorter elementary time unit, it is preferred to adopt the second solution, i.e. to implement an electronic interface between the IC card and the microprocessor of the external device, which interface is designed to control communication with the IC card via the serial communications line of the IC card.

At present, all electronic communications interfaces for IC cards use data serialization means that enable a byte to be reconstituted on reception, and that enable a byte to be decomposed on transmission. As a general rule, such serialization means are made using a standard component of the ACIA, EPCI, . . . , type, dedicated to mode serialization, and associated with a crystal or an oscillator for clocking its operation. At present, the means for serializing data on transmission or on reception are clocked by a first clock signal at a predetermined fixed frequency delivered by a crystal or an oscillator, and the microprocessor of the IC card is clocked from a second clock signal which is applied to the clock line (CK) of the IC card.

Standard components available on the market and dedicated to serialization generally include programmable clock dividers and are thus capable of taking a clock signal at a fixed frequency which is applied thereto for clocking purposes, and operating at various transmission speeds which correspond to the speeds commonly used between computers, i.e. in practice the following baud rates: 300, 600, 9600, 19200, 38400, and 115200. Programming the transmission speed of the component to one of the above-mentioned values is usually performed by initializing a parameter to a predetermined value in a register of the component. Thus, in the above-mentioned presently-known communications interfaces, in order to be able to dialog between the standard component dedicated to serialization and the IC card, it is necessary to program both the communications speed of the standard component and the elementary time unit ETU of the IC card to values that are compatible. The elementary time unit ETU of the IC card can be programmed either (first solution) by loading appropriate values for the parameters F and D into the IC card, or else (second solution) by appropriate adjusting the frequency of the clock signal applied to the card so that the elementary time unit ETU of the card is compatible with the transmission speed of the serialization means.

At present, whichever solution is used, the main drawback of presently-known communications interfaces is that they are capable of dialog with an IC card only at a determined transmission speed which is fixed by the serialization means of the interface and which can take only a very limited number of values. Furthermore, these transmission speed values are relatively small, and in particular they D0 not make it possible to dialog with an IC card at the maximum transmission capacity of the microprocessor of the IC card. For example, for a clock applied to the IC card at a frequency of 3.57 MHz, and for parameters F and D respectively equal to 372 and 1, the elementary time unit of the IC card is 104 µs, which corresponds to a transmission speed of 9600 baud; that transmission speed is compatible with the usual transmission values of a standard serialization component, and it is possible to program the standard component as a function of the frequency of the crystal or oscillator clocking the component, so as to set the transmission speed of the component at 9600 baud. However, if it is desired, for example, to dialog with an IC card configured with an elementary time unit that is considerably shorter, e.g. 4.65 µs (clock applied to the card at a frequency of 5 MHz, and parameters F and D respectively equal to 372 and 16), which corresponds to a transmission speed of 215000 baud, then it is no longer possible to program a standard serialization component to obtain such a transmission speed.

European patent applications EP-A-0 347 894 and EP-A-0 617 379, describe devices enabling read and write operations to be performed with an IC card and which implement a communications interface in which the second of the above-mentioned solutions is used, i.e. the elementary time unit ETU of the IC card is made compatible with the transmission speed of the serialization means of the interface by adjusting the frequency of the clock signal applied to the IC card.

More particularly, in European patent application EP-A-0 347 894, the clock signal applied to the IC card is generated either from a first clock signal at a predetermined fixed frequency that is equal, for example, to 14.7456 MHz (signal referenced 30 in FIG. 2 of that publication, and generated by the clock generator referenced 21), or else by a second clock signal of predetermined frequency, e.g. equal to 7.15909 MHz (signal referenced 31 and taken from the clock generator 32). More particularly, the selected first or second clock signal feeds a frequency divider whose function is to deliver the clock signal that is applied to the IC card at a frequency ratio that is programmed by the processor means (MPU). This frequency ratio is determined by said processor means MPU on the basis of the values of the parameters F and D of the IC card as previously read during initialization of the IC card. In that publication, the serialization means for transmission and reception of data interchanged with the IC card form an integral portion of the above-mentioned processor means MPU, and are not described. In particular, the clock signal for clocking said serialization means is not explained. In any event, it can be deduced from that publication, that the processor means MPU are designed to interchange data with the IC card at a predetermined dialog speed that cannot be modified, and are designed to operate on initialization of the IC card to recover the parameters F and D that are characteristic of the elementary time unit ETU of the IC card and to load the frequency divider with the appropriate division ratio, such that the clock signal applied to the IC card makes it possible to obtain an elementary time unit ETU which is compatible with the predetermined dialog speed of the processor means MPU.

In European patent application EP-A-0 617 379, the clock signal applied to the IC card corresponds either to the clock signal delivered by a first oscillator A, after the frequency of the signal has been divided, or else to the clock signal delivered by a second oscillator B. The signals delivered by the oscillators A and B are at predetermined fixed frequencies. The signal delivered by the oscillator A is also used as the reference clock signal for the transmission and reception serialization means. These serialization means are constituted by a standard component (UART). Such a standard component is designed to be clocked by a reference clock signal at a predetermined fixed frequency which corresponds to the frequency of the oscillator A. Such a standard component may optionally include a plurality of registers, enabling the speed at which data is transmitted or received by the serialization means to be set to a value that is predetermined, but only from a limited selection of discrete values. In a manner similar to above-mentioned European patent application EP-A-0 347 894, in the apparatus described in European patent application EP-A-0 617 379, the speed at which data is interchanged between the IC card and the serialization means UART is fixed at a predetermined value which can optionally, and at best, be selected from a limited number of discrete values, and the clock signal feeding the IC card is set to a value that enables the elementary time unit ETU of the IC card to be made compatible with the predetermined dialog speed of the serialization means.

OBJECTS AND SUMMARY OF THE INVENTION

A main object of the present invention is to provide a communications interface between a processor unit of the microprocessor type and an IC card, that enables the main abovementioned drawback of presently-known interfaces to be mitigated.

In conventional manner, the interface of the invention enables a processor unit to dialog with an IC card which includes a microprocessor and a clock pin for application of an external clock signal enabling the microprocessor of the IC card to be clocked, and which is suitable for receiving or transmitting data with an elementary time unit ETU for transmitting one bit that is equal to (K/Fs), where the factor (K) is a predetermined constant and the factor (Fs) corresponds to the frequency of the external clock signal applied to the clock pin of the IC card for the purpose of clocking operation thereof, the interface including a serial communications line for interchanging data with the IC card, and serialization means for serializing the data interchanged over the serial communications line.

In a manner characteristic of the invention, the interface comprises:

a clock delivering a first clock signal of adjustable frequency;

a clock output designed to be connected to the clock pin of the IC card and via which the first clock signal or a clock signal synchronous with said first clock signal travels; and means taking the first clock signal to deliver a second clock signal which is synchronous with the first clock signal and which enables the serialization means to be clocked, the frequency ratio between the clock signal passing via the clock output and the second clock signal being equal to the factor (K).

Unlike the previously-proposed prior art solutions, as implemented more particularly in the devices of the two above-mentioned European patent applications EP-A-0 347 894 and EP-A-0 617 379, the solution of the invention no longer consists in adapting the frequency applied to the IC card in order to make the elementary time unit ETU of the IC card compatible with the predetermined operating speed of the serialization means, but on the contrary consists in adapting the operating speed of the serialization means, i.e. the frequency of the clock signal H for clocking the serialization means, as a function of the elementary time unit ETU of the IC card. Thus, in the context of the invention, and unlike the solutions implemented in the two abovementioned European patent applications, the IC card no longer receives a clock signal for clocking its microprocessor at a frequency that is determined as a function of the operating speed of the serialization means, but advantageously receives a clock signal at a frequency that can be set to any value within a predetermined operating range. Data interchange between the IC card and the communication interface is synchronous relative to the clock of the interface. By adjusting the clock frequency of the interface, the elementary time unit ETU of the IC card is adjusted automatically, and in parallel so is the processing speed of the serialization means of the interface. To modify the speed of dialog with the IC card, it therefore suffices merely to adjust the frequency of the clock signal of the interface. By selecting a clock that is adjustable in continuous or quasi-continuous manner over an appropriate frequency range, e.g. a clock that is programmable over the range 0 to 20 MHz, it becomes possible to interchange data with the IC card at arbitrary dialog speed, which speed can be different from the few standard communications speeds, and more importantly to dialog with the IC card at high speed. Another advantage of the interface of the invention is that it makes it possible to avoid transmission errors in the event of the clock signal fluctuating or not being sufficiently accurate.

The possibilities offered by the interface of the invention of interchanging data at speeds that are high and easily adjustable are particularly advantageous in two types of application. The first type of application is testing the upper speed limit for dialog with an IC card. In this first application, it suffices to dialog with the IC card while progressively increasing the clock frequency of the interface until the IC card loses track, thereby making it possible to determine the maximum frequency that is actually applicable to the IC card. The second application lies in manufacturing IC cards, and more particularly it applies during the step of configuring IC cards (pre-personalization or personalization) by loading data into the memory, and in particular data required for operation of the resident program of the IC card and/or for ensuring operating security for the IC card. Advantageously, interchanging data with the IC card at the high speed made possible by the interface of the invention makes it possible to accelerate the speed at which IC cards are loaded, and thereby makes it possible to increase very significantly the rate at which IC cards can be manufactured.

BRIEF DESCRIPTION OF THE DRAWING

Other characteristics and advantages of the invention appear more clearly on reading the following description of a preferred embodiment of the invention, which description is given by way of nonlimiting example and with reference to the sole accompanying FIGURE which is a block diagram of the electronic architecture of a device whose function is to interchange read and write data with an IC card, and which is fitted with a communications interface of the invention.

MORE DETAILED DESCRIPTION

The device shown in FIG. 1 essentially comprises an electronics card 1 based on a microprocessor 1a of conventional architecture, and a communications interface 2 of the invention for enabling the microprocessor 1a to interchange transmit and receive data with an IC card (not shown). More generally, the microprocessor 1a may be constituted by any processor unit designed for transmit and/or receive dialog with an IC card. To interchange data, the interface 2 includes in conventional manner a both-way serial communications line 3 connected to an outlet 3a of the interface 2. In operation, i.e. when the IC card is connected to the interface 2, the outlet 2a is connected to the I/O pin of the IC card dedicated to transmitting or receiving data in serial mode.

In the description below, it is assumed that the data interchanged over the serial communications line 3 is serialized in compliance with the format of international standard ISO 7816-3: one start bit (always 0), eight data bits D0 to D7 or D7 to D0, a parity bit, and a stop bit.

Naturally, the invention is not limited to that type of format, and it can be implemented in particular to convey data that is not necessarily in 8-bit byte format, but which can be made up of an arbitrary number of data bits.

To enable data to be interchanged between the microprocessor 1a and the IC card, the interface 2 has serialization means essentially constituted by two modules: a first module 4a dedicated to transmitting data from the microprocessor to the IC card over the serial communications line 3, and a second module 4b dedicated to the microprocessor 1a receiving data transmitted by the IC card and received by the interface over its communications line 3. The transmission module 4a comprises in succession a transmission register 5, a module 6 having the function of adding a parity bit to the data (D0–D7) from the register 5, and a transmit serialization module 7. The transmit register 5 is conventionally write-addressable by the microprocessor 1a by means of a data bus (1b), an address bus (1c), and a control bus (1d). The function of the module 7 is to transmit in succession over the serial communications line 3 and at a rate fixed by a clock signal (H), the data bits (D0–D7) and the parity bit coming from the module 6, and also to insert the start bit and the stop bit. The receive module 4b comprises a module 8 for serializing received data, having the function of sampling the bits conveyed on the serial communications line 3 at a rate which is set by the clock H, and of reconstituting at its output a data word (D0–D7) in the appropriate format. At the output from the module 8, the reconstituted data word (D0–D7) is loaded into a receive register 9 which is read-addressable in conventional manner by the microprocessor 1a. In addition to the transmit module 4a and the receive module 4b, the serialization means also comprise a sequencer 10 delivering two control signals 10a and 10b respectively to the transmit module 4a and the receive module 4b. At its input, the sequencer 10 receives an acknowledge signal 10c issued by the module 8. The sequencer 10 can be controlled by the microprocessor 1a via a control register 11 which is read- and write-addressable by the microprocessor 1a.

Data is transmitted and received over the serial communications line 3 in the following manner. In transmission, the microprocessor loads the data word (D0 to D7) that is to be transmitted into the transmit register 5 and it controls the sequencer 10 by loading the appropriate control data into the control register 11. The sequencer 10 controls the transmit module 4a by means of the control signal 10a. The data (D0 to D7) loaded into the transmit register 5 is transmitted in series over the serial communications line 3 at a transmit rate which is fixed by the frequency of the clock signal H. In reception, after the interface 2 has detected a start bit by means that are described below, the receive serialization means 8 reconstitute the data word (D0–D7) received serially over the serial communications line 3 at a receive rate that is fixed by the clock signal H, and they load the reconstituted data word (D0–D7) into the receive register 9, informing the sequencer 10 that reception has taken place and that the data has been loaded, by means of the acknowledge signal 10c. The sequencer 10 informs the microprocessor 1a that data has been received by loading the appropriate control data into the register 11 which is read periodically by the microprocessor 1a. When the microprocessor 1a detects via the register 11 that data has been received and loaded into the receive register 9, it recovers said data over the data bus 1b.

The essential characteristic of the invention lies in implementing clock signals firstly for clocking the transmit and receive modules 4a and 4b, and secondly for clocking the operation of the microprocessor of the IC card. A preferred implementation is described below.

With reference to the preferred embodiment shown in accompanying FIG. 1, the interface 2 has a clock generator 12 which is programmable by the microprocessor 1a over a synchronous serial link constituted by a data line 1e and a clock line 1f. The clock generator 12 delivers a clock signal 12a at a frequency which is programmable by the microprocessor 1a to an arbitrary value in a predetermined range of frequencies. In a particular embodiment, the clock generator 12 is constituted by a standard component sold under the reference FOX6053 and serves to deliver a clock signal 12a at a frequency that can be programmed to an arbitrary value with error of about 1% in the range a few hundred Hz to 120 MHz.

The interface 2 also has a counter 13 which converts the clock signal 12a into the clock signal H for clocking the transmit and receive serialization modules 7 and 8. The counter 13 is associated with a programming register 14 which is advantageously write-addressable by the microprocessor 1a. The function of the counter 13 is to count each front (rising or falling) in the signal 12a and to deliver a clock signal H which is synchronous with the clock signal 12a delivered by the clock generator 12 and which is at a lower frequency whose value corresponds to dividing the frequency of the clock signal 12a by the data loaded by the microprocessor 1a into the programming register 14. The programmable counter 13 also receives a synchronization signal 15a as input from a module 15 whose function is to detect that a start bit has been received on the serial communications line 3. In particular, when the IC card transmits serial data, it begins by transmitting the start bit over the serial communications line 3. The module 15 detects the change of state of the line 3 corresponding to the IC card transmitting a start bit, and it synchronizes operation of the counter 13 on said start bit.

In conventional manner, an IC card is suitable for interchanging data over its I/O pin with an elementary time unit for transmitting a single bit that is commonly referred to as an ETU, which unit can be parameterized and is equal to the ratio K/Fs. The factor K is a predetermined constant that can be parameterized in the IC card, and the factor Fs corresponds to the frequency of the external clock signal that is applied to the clock pin CK of the IC card to clock operation of the microprocessor of the IC card. In the preferred embodiment of FIG. 1, the programming register 14 for programming the counter 13 is loaded by the microprocessor 1a with a data word corresponding to the value to be given to the factor K corresponding to the parameter of the IC card with which the microprocessor 1a is to interchange data.

The clock signal 12a delivered by the programmable clock generator 12 is generally connected to an outlet pin 17 of the interface 2, which outlet pin is designed to be connected to the clock pin CK of the IC card, i.e. to the pin of the IC card on which the external clock signal for clocking the microprocessor of the IC card is to be applied. Between the pin 17 and the clock generator 12, there is provided an interface 16 enabling the (TTL) logic level of the signal 12a to be mapped with an analog signal whose voltage is compatible with the voltage levels commonly used for the CK pin of an IC card.

According to the invention, it is essential for the clock signal that is to be applied to the IC card via the pin 17 and for the clock signal H delivered by the counter 13 to clock the serialization means 7 and 8 to be synchronous with the common clock signal 12a whose frequency is also programmable. Data interchanged over the serial communications line 3 thus becomes synchronous relative to the clock signal 12a delivered by the programmable clock generator 12, and is additionally undisturbed in the event of any fluctuation in the frequency of the clock signal 12a. Consequently, it is advantageously possible to cause the microprocessor 1a to dialog with the IC card at an arbitrary transmission speed within the frequency range of the clock generator 12, with the transmission speed corresponding to the frequency of the clock signal H. To change dialog speed, it suffices for the microprocessor 1a to act on the frequency of the clock signal 12a by programming a new value for the frequency of the programmable clock generator 12. More particularly, dialog with the IC card can take place at high speeds going up to the limiting speed for dialog between the microprocessor and the IC card.

It should be observed that the communications interface of the invention is not limited to the preferred embodiment as described above. The serial communications line is not restricted to being a both-way line and it could be subdivided into two one-way lines respectively dedicated to transmitting and to receiving data. In the embodiment described above, the clock signal delivered by the pin 17 has the same frequency as the clock signal 12a delivered by the programmable clock generator 12. However the invention is not limited thereto. The only characteristic which is necessary for the invention with respect to the clock signal delivered by the pin 17 is that this clock signal should be synchronous with the clock signal 12a. Consequently, in another variant, it is possible for the frequency of the clock signal passing via the pin 17 to be a multiple of the frequency of the clock signal 12a, it being possible for example to interpose a frequency divider between the pin 17 and the clock signal 12a. Under such circumstances, the programming register 14 associated with the counter 13 is loaded with a data word that takes account not only of the factor K of the elementary time unit ETU of the IC card, but also of the frequency ratio between the clock signal passing via the outlet pin 17 and the clock signal 12a so that, as a general rule, the frequency ratio between the clock signal passing via the outlet pin 17 and the second clock signal H is equal to the factor K.

The programmable clock generator 12 is not necessarily programmable by the microprocessor 1a, but more generally it could be constituted by any clock generator designed to deliver a clock signal 12a at a frequency that is adjustable over a given range of frequencies.

More particularly, the interface of the invention provides various advantageous additional functions as described below. A first additional function is that of counting elementary time units ETU for the microprocessor 1a. This function is implemented by means of a counter 18 which can be initialized by the microprocessor 1a via a reset-to-zero signal 1g and which is incremented (or decremented) by the clock signal H delivered by the programmable counter 13. Each rising (or falling) front of the clock signal H corresponds to an elementary time unit ETU of the IC card. The counter 18 is associated with a count register 19 which is write-addressable by the microprocessor 1a and which is designed to contain the final (or initial) value of the counter 18. When the current value of the counter 18 is equal to the value loaded in the count register 19 (or is zero), the counter generates an interrupt via signal 18a for application to the microprocessor 1a. Advantageously, using a counter 18 that is programmable by the microprocessor 1a makes it simpler for the microprocessor 1a to calculate the parameters 25 suitable for dialog using a basic time unit which is the elementary time unit ETU of the IC card (inter-character times, waiting periods, etc. . . . ).

A second additional function provided by the interface shown in FIG. 1 is forcing the serial communications line 13 for a predetermined duration in the event of a transmission error being detected in reception. This function is implemented by the modules 20 and 21. The module 20 is a parity test module, i.e. a module which verifies whether the parity bit sampled on line 3 by the receive serialization means 8 has the right value. If an error is detected, the module 20 initiates the module 21 whose function is to force the serial communications line 30 for a predetermined duration. The module 20 preferably detects the parity bit after the means 8 have received the stop bit, and forcing occurs after a time interval that corresponds to 10.5 ETU starting from detection of the start bit on line 3 by the module 15. Forcing of the line 3 is detected by the IC card which, under such circumstances, can repeat transmission of the data word that has been wrongly received.

The third additional function of the FIG. 1 interface is associated with detecting an error on transmission, and it is implemented mainly by the module 22 whose function is to test the state of the serial communications line 3 under the control of the transmit serialization means 7 by means of a control signal 7a. More particularly, when the serialization means 7 has transmitted the last bit for transmission over the serial communications line 3, i.e. in the context of international standard ISO 7816-3, the eleventh and last bit corresponding to the stop bit, said means 7 causes the module 22 to detect the state of the I/O line. If the state of the I/O line is not compliant, i.e. in the context of international standard ISO 7816-3, if the state of the line 3 is zero, then the module 22 generates an error by changing the value of a bit in the state register 23 which is read-addressable by the microprocessor 1a so as to enable the microprocessor 1a to use software to process the transmit error that has just been detected.

What is claimed is:

1. A communications interface enabling a processor unit to dialog with an IC card, the IC card comprising a microprocessor, a clock pin for application of an external clock signal enabling the microprocessor of the IC card to be clocked, and an I/O pin, said microprocessor being able to receive external data or to transmit data via said I/O pin, with an elementary time unit for receiving or transmitting one bit that is equal to (K/Fs), where the factor (K) is a predetermined constant and the factor (Fs) corresponds to the frequency of the external clock signal applied to the clock pin of the IC card for the purpose of clocking operation thereof, the interface comprising:

a serial communications line for interchanging data with the IC card via the I/O pin, a transmitting module, being written-addressable by the processor unit and comprising serialization means for serializing and transmitting over the serial communications line, data received from the processor unit;

a receiving module, being read-addressable by the processor unit, and comprising serialization means for serializing data received over the serial communications line;

first clock means for delivering a first clock signal having an adjustable frequency;

a clock output designed to be connected to the clock pin of the I/C card and receiving the first clock signal; and second clock means for delivering a second clock signal which is synchronous with the first clock signal and which enables the serialization means of the transmitting module and the serialization means of the receiving module to be clocked, the frequency ratio between the first clock signal and the second clock signal being equal to the factor (K).

2. The interface according to claim 1, wherein the frequency of the first clock signal is adjustable in continuous or quasi-continuous manner over a predetermined range of frequencies.

3. The interface according to claim wherein the second clock means for delivering the second clock signal comprises a programmable counter.

4. The interface according to claim 1, further comprising a counter for counting elementary time units and designed to be incremented or decremented by the second clock signal.

5. The interface according to the claim 1, further comprising a parity test module connected to the serialization means of the receiving module, and having the function of detecting an error in reception by the serialization means of the receiving module, and means for holding the state of the serial communications line to a predetermined state on detection of an error in reception by the parity test module.

6. The interface according to claim 1, further comprising means for testing the state of the serial communications line after each transmission of a data word by the serialization means of the transmitting module, and means for generating an error in the event of an erroneous state being detected on the serial communications line.

7. An apparatus comprising a processor unit and a communications interface enabling the processor unit to dialog with an IC card, the IC card comprising a microprocessor, a clock pin for application of an external clock signal enabling the microprocessor of the IC card to be clocked, and an I/O pin, said microprocessor being able to receive external data or to transmit data via said I/O pin, with an elementary time unit for receiving or transmitting one bit that is equal to (K/Fs), wherein the factor (K) is a predetermined constant and the factor (Fs) corresponds to the frequency of the external clock applied to the clock pin of the IC card for the purpose of clocking operation thereof, wherein the interface comprises:

a serial communications line for interchanging data with the IC card via the I/O pin;

a transmitting module, being written-addressable by the processor unit, and comprising serialization means for serializing and transmitting, over the serial communications line, data received from the processor unit;

a receiving module, being read-addressable by the processor unit, and comprising serialization means for serializing data received over the serial communications line, and;

first clock means for delivering a first clock signal having an adjustable frequency;

a clock output designed to be connected to the clock pin of the IC card and receiving the first clock signal; and second clock means for receiving the first clock signal and delivering a second clock signal which is synchronous with the first clock signal and which enables the serialization means of the transmitting and receiving modules to be clocked, the frequency ratio between the first clock signal and the second clock signal being equal to the factor (K).

8. The apparatus according to claim 7, wherein the frequency of the first clock signal delivered by the clock of the communications interface is programmable by the processor unit.

9. The apparatus according to claim 7, wherein the frequency ratio between the first clock signal and the second clock signal is programmable by the processor unit.

* * * * *